United States Patent [19]

Asami

[11] Patent Number: 4,667,284

[45] Date of Patent: May 19, 1987

[54] MULTIPLEXING CONTROL UNIT

[75] Inventor: Kazuo Asami, Hitachi, Japan

[73] Assignee: Hitachi, Ltd., Tokyo, Japan

[21] Appl. No.: 697,585

[22] PCT Filed: May 5, 1984

[86] PCT No.: PCT/JP84/00251

§ 371 Date: Jan. 17, 1985

§ 102(e) Date: Jan. 17, 1985

[30] Foreign Application Priority Data

May 18, 1983 [JP] Japan .................................. 58-85803

[51] Int. Cl.[4] .............................................. G05B 9/03
[52] U.S. Cl. ....................................... 364/187; 371/9; 371/36; 371/68
[58] Field of Search ...................... 364/184, 187, 133; 371/9, 68, 36

[56] References Cited

U.S. PATENT DOCUMENTS

| | | | |
|---|---|---|---|
| 4,101,958 | 7/1978 | Patterson | 371/68 |
| 4,327,437 | 4/1982 | Gelderloos | 371/68 |
| 4,412,281 | 10/1983 | Works | 371/9 |
| 4,472,806 | 9/1984 | Blair | 371/68 |

OTHER PUBLICATIONS

Transactions of the American Nuclear Society and European Nuclear Society, 1980 Conference on World Nuclear Energy.
Accomplishments and Perspectives; Nov. 16-21, 1980; vol. 35; pp. 406-411; American Nuclear Society, Inc.

*Primary Examiner*—Joseph Ruggiero
*Assistant Examiner*—Allen MacDonald
*Attorney, Agent, or Firm*—Antonelli, Terry & Wands

[57] ABSTRACT

This is a multiplexing control unit comparing a plurality of subsystems completely separate and independent.

Each subsystem is constituted as follows, and one objective device is controlled at the final stage output of the multiplexing control unit.

A quantity or state of a plant is detected by a detector. A signal from the detector is output through a controller at each subsystem, and a normalcy decision signal for an output signal from the controller is output. A synthetic decision section selects one controller functioning most normally according to the normalcy decision signal of the output signal from the controller and outputs a control signal corresponding to the selected controller. An output signal switching section selects an output for the controller functioning most normally according to the control signal from the synthetic decision division to output to a device to be controlled.

13 Claims, 5 Drawing Figures

MULTIPLEXING CONTROL UNIT

TECHNICAL FIELD

This invention relates to a multiplexing control unit.

BACKGROUND ART

Various methods are conceivable for attaining high reliability in a control unit. The most common method has been to specify high reliability of each hardware component used in the control unit. More specifically, the method has included requiring high reliability for selected parts and securing a satisfactory design tolerance, or screening and aging parts and limiting the number of working parts through the application of integrated circuits. However there are limits to the degree of reliability that can be attained at the hardware level. Therefore, both the necessity and the effectiveness of securing high reliability at the system level have been widely recognized in recent times.

For example, in a system with the conventional single control unit, a single capacitor or transistor malfunctioning can greatly affect the entire control system. In fact, an analysis of causes of malfunctions in a control system in the past indicates that this kind of trouble is the most frequent cause. It is therefore that a multiplexing control system is called for.

A multiplexing control unit for control systems is given, for example, in FIG. 1. Toshiba BWR Power Control System ADMIX with Triple-Control Channel and Self-Diagnoses, on pages 406 to 411 of "BWR PLANTS IN JAPAN—A NEW PERSPECTIVE", reported in TRANSACTIONS OF THE AMERICAN NUCLEAR SOCIETY AND THE EUROPEAN NUCLEAR SOCIETY 1980 INTERNATIONAL CONFERENCE ON WORLD NUCLEAR ENERGY—ACCOMPLISHMENTS AND PERSPECTIVES, Vol. 35. One example of a mean value selected triplex plant control unit is disclosed in the FIG. 1. In this triplex plant control unit, the process signals, "reactor water level," "feedwater flow," and "main steam flow" used for control as feedback signals are triplex and each is input, to a mean value selector circuit, MVG, which outputs a mean value selected from the three signals. The signal selected through the mean value selector circuit, MVG, is input to a triplex master controller M/C. The mean value of three output signals computed by each M/C is input to the mean value selector circuit, MVG, and the output is input to a secondary controller S/C. The mean value selector circuit, MVG, is constituted, for example, of a high value input selector circuit and a low value input selector circuit.

In this system, however, since a malfunction in the mean value selector circuit is part of a common mode, the effect will be reduced by half unless the mean value selector circuit MVG has been made highly reliable. Then, if a multiplex unit including the power supply finally is considered, a power abnormality in the mean value selector circuit can lead to an abnormality in the entire triplex plant control unit. Furthermore, when the control unit has a multiple output, since the system takes a mean value at each output signal, each control unit contributes to the error occurring because of a hunting phenomenon, depending on the system to be controlled.

DISCLOSURE OF INVENTION

An object of this invention is to provide a multiplexing control unit with high reliability.

As will be apparent from the description given in detail hereunder, the invention is to attain the above object by realizing, so to speak, a multiplex decentralized system configuration, comprising a multiplexing configuration for masking trouble arising unexpectedly and for executing a failing function, and a decentralizing configuration for minimizing danger at the time that the unexpected trouble occurs.

BEST MODE FOR CARRYING OUT THE INVENTION

Figure 1:
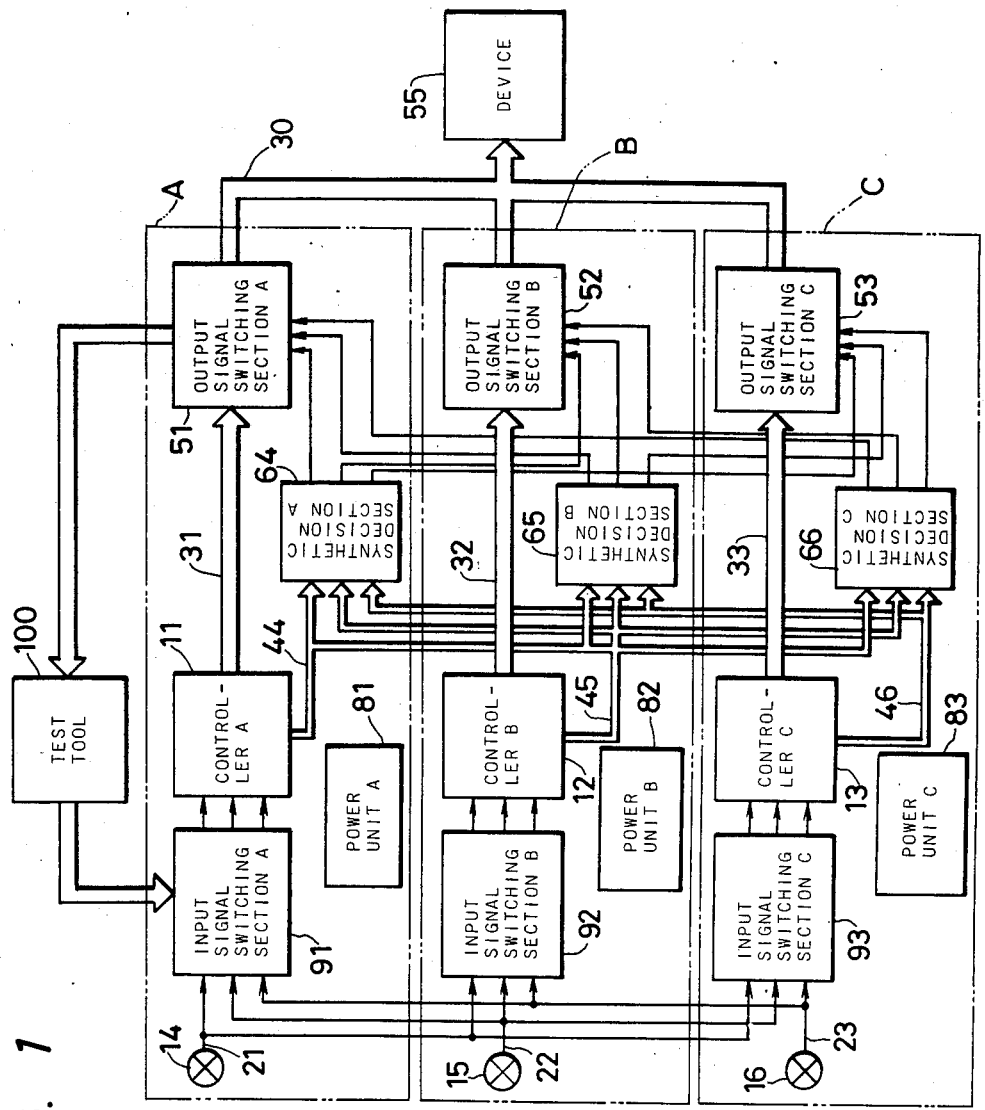
FIG. 1 is a system drawing of a triplex plant control unit given in one preferred embodiment of this invention.

Referring to FIG. 1, a triplex plant control unit of this embodiment comprises three subsystems A, B and C isolated and independent perfectly.

The subsystems A, B and C of the triplex plant control unit comprise respectively triplex detectors 14, 15, 16; input signal switching sections 91, 92, 93 to input a detection signal from each detector; controllers 11, 12, 13 to output a control signal according to signals from the input signal switching sections; synthetic decision sections 64, 65, 66 to select one controller which is regarded as the most normal depending on the signal from the controllers; output signal switching sections 51, 52, 53 to output the output signal from the controller selected according to a selection command signal from the synthetic decision sections to equipment to be controlled; and exclusive power units 81, 82, 83 working therefor; and the subsystems A, B, C have features described in detail hereunder. Here, a test tool 100 serves for checking each circuit of the subsystems A, B, C.

As will be described hereinafter, the triplex plant control unit functions such that should an abnormality arise in one subsystem, the abnormality is detected with a self-diagnostic function by the controllers 11, 12, 13 in an abnormal subsystem to which the abnormal part belongs; and the abnormal subsystem is detached from other normal subsystems. In the unlikely event that an abnormality could not be detected by the self-diagnostic function of the abnormal subsystem, the abnormality would be detected by a mutual diagnostic function; therefore, no influence would be exerted on other normal subsystems, and a phenomenon due to the abnormality would be confined to the abnormal subsystem.

A main entity in each subsystem and its operation will now be described.

(1) Power supply to subsystems:

The subsystems have independent power units 81, 82, 83. Should an abnormality arise, for example, on power unit 81 in subsystem A, subsystem A is detached from the triplex plant control unit. Thus, no influence would be exerted, in principle, on subsystems B and C by the output of subsystem A. Should this occur unexpectedly, an input signal for one channel will be lost in an information input section described hereinafter.

(2) Method for inputting plant information

The triplex plant control unit has a signal input system itself multiplexed in effect. That is, the triplex plant control unit is, so to speak, an information processor to determine an output signal depending on plant information. Accordingly, where input information is a single item, it may be that the objective cannot be accomplished at the time that the abnormality occurs. In this embodiment, a three-piece detector for measuring the same quantity or state of the plant is provided. That is, three detectors 14, 15, 16 which measure the same quantity or state have been provided in the plant. To install all detectors in triplicate would complicate the system unnecessarily; therefore, only such detectors as are essential for the control of the plant operation have been provided in triplicate.

Now, output signals of the detectors 14, 15, 16, namely plant information 21, 22, 23 (feedback signals from equipment to be controlled) are triplicated in principle in this embodiment. Those input information will be input to the controllers 11, 12, 13 basically through the input signal switching sections 91, 92, 93 of each subsystem. Then, for a detector such as a pressure transmitter which requires an external supply, power is supplied from the power unit of the subsystem to which it belongs. Accordingly, where the power unit of one subsystem is faulty, the detector having power supplied from that power unit does not operate, however, the other two detectors operate normally; therefore, the controller of each subsystem is sure to get some input information. Thus, plant information will never be lost completely. The possibility that the three detectors would fail simultaneously is extremely remote. A method to input the multiplexed signals to each subsystem will now be described.

The method to input a signal which has been output from each triplicated detector to detect the same quantity of state of the plant for each subsystem comprises an input of plant information which has been output from each detector to each of the subsystems as shown in FIG. 1, or an input only to the subsystem to which the detector belongs (not illustrated). Which method is used is depends mainly on the degree of reliability required and cost effectiveness. Simply stated, the former method inputs three times as much plant information as the latter method, with a consequent increase in the input division and the processing section of the input signal. In practice, a signal particularly essential for the control of the plant is subjected to the former method, each multiplexed signal is checked in each subsystem, and the signal regarded as most closely approximating the true value is selected; or it is derived with autocomputing data. This prevents the subsystems, as far as possible, from being adversely affected by an abnormality in the detector provided in the plant.

(3) Separating and isolating input signals

Plant information detected on detectors 14, 15 and 16 is input to controllers 11, 12, 13 through the input signal switching sections 91, 92 and 93. The input signal switching sections 91, 92, 93 are physically constituted of electromagnetic relays, mercury relays and the like in this embodiment. However, the input switching signal sections are not necessarily limited to this kind of hardware.

Should an abnormality arise in one subsystem (for example, abnormality of the power unit or abnormality of the controller), the abnormal subsystem is isolated completely from the equipment to be controlled and the plant 1 by the corresponding input signal switching section and the output signal switching section (described hereinafter).

Then, for easy trouble-shooting of the abnormal subsystem thus isolated and also to ensure efficient operation after repair, the input signal switching sections 91, 92, 93 and the output signal switching sections 51, 52, 53 are constituted so as to input a signal from the test tool 100. The function is realized by inputting the signal from the test tool 100 to a contact U side of the relay shown in FIG. 2 described hereinafter. Further, the test tool 100 has a signal input section, a signal computing section and a signal generating section which are not illustrated.

Figure 2:
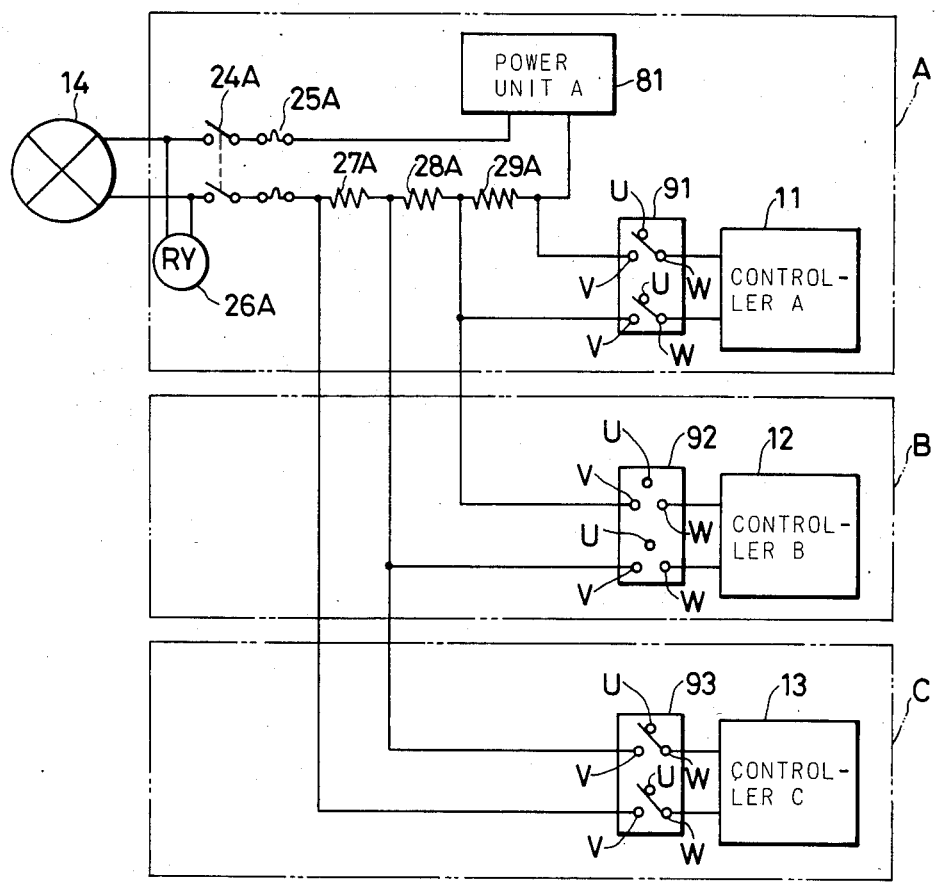
FIG. 2 is a system drawing of a signal transmission circuit on the signal input side of the control unit in each subsystem shown in FIG. 1.

A concrete signal transmission circuit through which an output signal of the detector 14 belonging to the subsystem A is transferred to the controllers 11, 12 and 13 provided in each subsystem is shown in FIG. 2. Power to the detector 14 is supplied from the power unit 81 in the subsystem A. A fuse 25A, a switch 24A and a relay 26A are connected to a power line (two-wire detector given by way of example; coincident with signal line). The fuse 25A protects the signal transmission circuit. The switch 24A is provided in such manner that the detector 14 can be isolated from the power unit 81 and each controller at the time of maintenance for an abnormality arising unexpectedly on the detector 14. The relay 26A controls power to the detector 14. Whether the output signal of the detector 14 which is put in the controllers of each subsystem is active or inactive, that is, whether it may or may not be disregarded, depends on the operating position of the switch 24A and the contact state of the relay 26A. The output signal of the detector 14 (generally at 4 to 20 mA·DC) is converted into a voltage signal through resistances 27A, 28A and 29A working at approximately 50Ω. The voltage signal is input to controllers 11, 12 and 13 through contacts of input signal switching sections (mercury relays) 91, 92 and 93 respectively. In this case, contacts V and W of input signal switching sections 91, 92 and 93 are connected.

Detectors 15 and 16 are also connected to a signal transmission circuit similar to FIG. 2. Output signals of detectors 15 and 16 are transferred to controllers 11, 12 and 13 through the above signal transmission circuit.

Depending on an input circuit system of the controllers 11, 12 and 13, the input impedance is 10 to 100Ω each when power is being input, but is capable of dropping to several KΩ or below when power is not being input. Depending on such signal transmission circuits, small resistances 27A, 28A and 29A are arranged in series at each system; therefore, malfunctions such as shortcircuits and grounding of the controllers 11, 12 or 13 in the subsystem or changes in internal impedance would have little effect on the input signal (plant information) to other subsystems. A contact U of input signal switching sections 91, 92 and 93 is connected to a connector (not illustrated) of test tool 100. Where an abnormality arises on some subsystem, the contacts V and W of the input signal switching section in the abnormal subsystem are disconnected, then the contacts U and W are connected. A mimic signal corresponding to the output signal of the detector which has been output from test tool 100 is input to the controller of the abnormal subsystem through the contacts U and W. Various tests at every subsystem are carried out by causing the output signal of the test tool 100 to be input to the controller.

(4) Function and output signal of controllers

Controllers 11, 12 and 13 output control signals 31, 32 and 33 respectively, which are obtained through the plant information 21, 22 and 23 input through the input signal switching divisions 91, 92, 93. However, while the controller to which test tool 100 is connected is subjected to a test, a signal coordinated with an output mode of test tool 100 is output. Then, an abnormality arising in the subsystem can be found early with a self-diagnosis such as a parity check which has been incorporated into controllers 11, 12, 13 of the corresponding subsystem to which they belong and a mutual diagnosis carried out in controllers 11, 12, 13 on inputs from other subsystems through the information transmission circuit shown in FIG. 3, thereby determining from which control signal 31, 32 or 33, to input to equipment 55 to be controlled. That is, a data item of its own subsystem is not always output, but the data derived from the majority which is regarded as most appropriate at that point in time according to results obtained through diagnoses is output to the equipment to be controlled.

Figure 3:
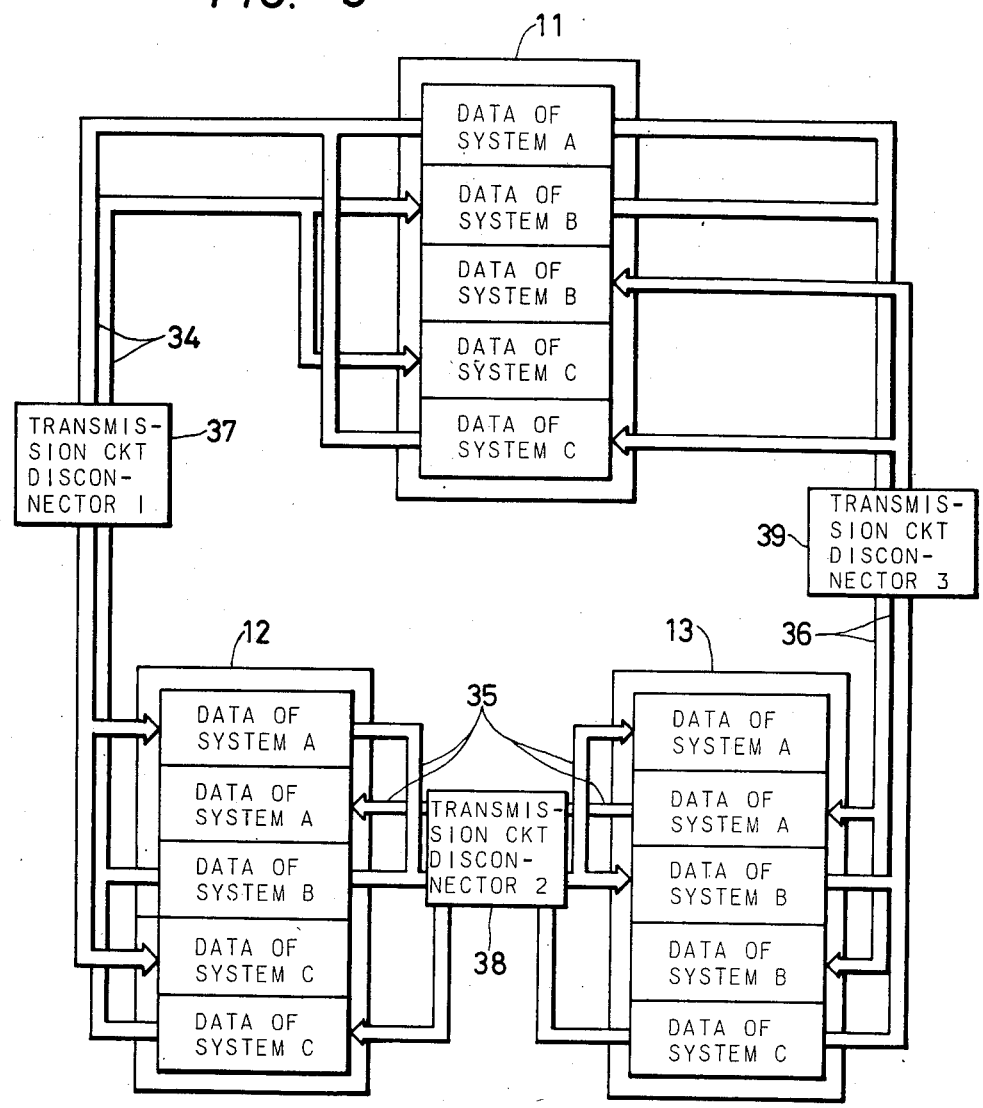
FIG. 3 is a system drawing of an information transmission circtit between control units of each subsystem shown in FIG. 1.

In view of a minimization of common parts, it may be desirable that no signal be transferred mutually between the subsystems, which is consistent with the idea of multiplex decentralization. However, data will have to be transferred somewhat to secure a smooth operation at the time of switching between the subsystems and an internal data setting function at when the subsystem is set up after an abnormal reset. Particularly in cases where data requiring a prior records such as proportional-integral control or latch data is handled, some kind of data copying function will be necessary. Also, to insure detection of abnormalities, other data than auto-data will have to be obtained for comparison. However, as described above, this function is capable of causing a common mode problem; therefore, it must be applied with caution. In this embodiment, a data double transmission system and a data control system are employed for each subsystem, as shown in FIG. 3, in addition to an application of highly reliable data transmission circuits 34, 35 and 36 and transmission circuit disconnectors 37, 38 and 39, thereby preventing as much as possible, the creation of a common mode. Prevention of the function from forming a common mode will be described with reference to FIG. 3. Controllers 11, 12 and 13 in FIG. 3 correspond to the controllers 11, 12 and 13 in FIG. 1, respectively.

The data transmission circuits 34, 35 and 36 employ an insulated data transmission circuit for which an optical transmission technique is applied. In FIG. 3, the data transmission circuits 34, 35 and 36 are shown in two parts each, which make it easy to trace the flow of data through the controllers 11, 12 and 13. Therefore, the data transmission circuits 34, 35 and 36 may be considered as single unit for practical purposes. Data transmission circuit 34 connects controller 11 and controller 12. Data transmission circuit 35 connects controller 12 and controller 13. Data transmission circuit 36 connects controller 11 and controller 13. One data transmission circuit transfers data in one controller connected thereby to the other controller. Conversely the data transmission circuit transfers data in the other controller to the first controller. Consequently, data on subsystem A in controller 11 of subsystem A is transferred to controller 13 of subsystem C through data transmission circuit 36 and then transferred to controller 12 of subsystem B therefrom through data transmission circuit 35. Conversely, the data on the subsystem A in controller 11 is transferred to controller 12 through data transmission circuit 34 and further transferred to controller 13 therefrom through data transmission circuit 35. Data on sub-system B in controller 12 and data on subsystem C in controller 13 are also transferred to other controllers through each data transmission circuit as in the case of data on subsystem A. One controller has its own data and two kinds each of data from the other two controllers transferred through different data transmission circuits, that is to say, five kinds of data in total.

Transmission circuit disconnector 37 is provided on data transmission circuit 34. Transmission circuit disconnector 38 is provided on the data transmission circuit 35. Further, transmission circuit disconnector 39 is provided on data transmission circuit 36.

An abnormality arising, if any, on one of data transmission circuits 34, 35 and 36 or on one of controllers 11, 12 and 13 will be detected by auto-diagnosis or comparing the data in the auto-controller with the data input to the auto-control from other subsystem controllers through the data transmission circuits 34, 35, 36. Where the abnormality is detected by the so-called mutual diagnosis, the abnormal part is isolated from the normal part by actuating the transmission circuit disconnector corresponding to the abnormal part. In this way, the common mode problem can be prevented. Each data transmission circuit employs a double transmission system whereby data output from the controller to which it is connected is transmitted together with data from other controllers obtained through other transmission circuits, as described hereinbefore; therefore, even in cases where one data transmission circuit is abnormal, data from all the other controllers can be input to each controller.

The double transmission system thus employed in the embodiment may realize and secure duplex and reliable data transmission even from a single data transmission circuit interconnecting the controllers.

The controllers 11, 12 and 13 carry out mutual diagnosis according to data from each subsystem obtained through each data transmission circuit. Basically, controllers 11, 12 and 13 determine output data according to a logic applying 2-out-of-3 logic to a bit data and also to a logic on a deviation check to a numeric data. The system is then such that the determination will be made independently by the decision of each subsystem according to the data belonging to each subsystem at that point in time; therefore, the common mode problem will be avoided. Further, the system design is such that the own data belonging to a controller, data belonging to the other controllers and the controller output data are handled separately in the controller. Accordingly, if it should occur that the self-operation data of some controller does not coincide with data of the other two subsystems, the output data of the controller is regarded as referring to data of the other two coincident subsystems. However, the auto-data will not be modified unless the inconsistency occurs repeatedly or continuously over an extended period of time. Thus, from employing the system wherein the automatic result of a controller and an actual output signal from the controller are controlled separately, the auto-data is prevented from being altered by data from the other subsystems, and the data from each subsystem which is used for mutual diagnostic function is made independent.

Figure 4:
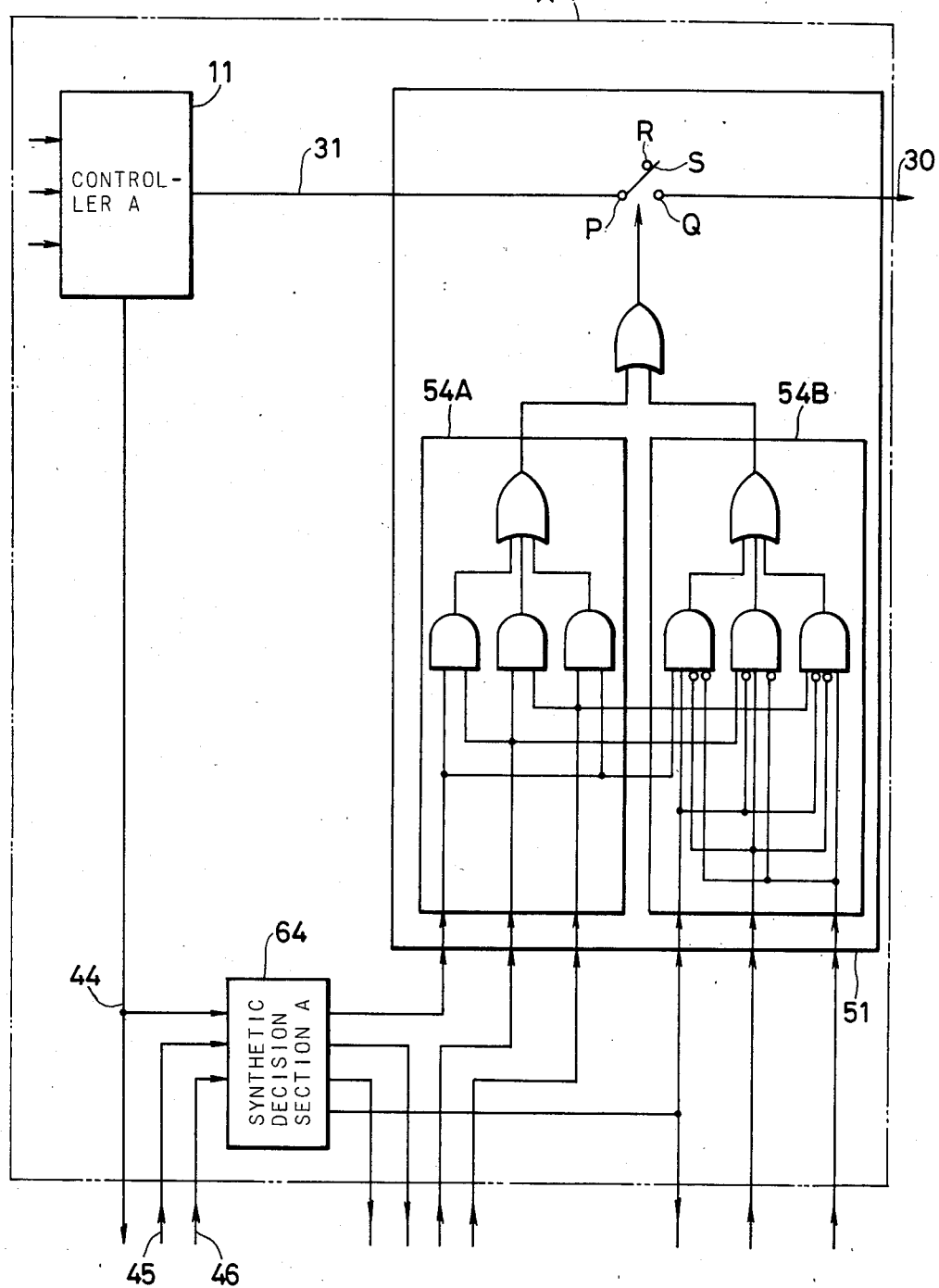
FIG. 4 is a system drawing of a signal transmission circuit on the signal output side of the control unit in each subsystem shown in FIG. 1.

Self-diagnostic and mutual diagnostic results obtained each through the controllers 11, 12 and 13 are output to the synthetic decision section 64, 65 and 66 from the controllers 11, 12 and 13 as diagnostic result signals 44, 45 and 46 shown in FIG. 1 and FIG. 4. The diagnostic result signals 44, 45 and 46 are input to one synthetic decision section. In this embodiment, the controllers 11, 12 and 13 determine normalcy at each subsystem, and output "1" to a subsystem regarded as normal but "0" to a subsystem regarded as abnormal. This is to simplify decision logic for the synthetic decision circuits 64, 65 and 66 as will be described hereinafter. That is, if the controller 11, for example, of those 11, 12 and 13 malfunctions, the synthetic decision circuits are necessary to minimize selective switching time of a control signal of the output signal switching division 51 to cope with the problem of which diagnostic result signal 45 or 46 from the controller 12 or 13 to select to output to the output signal switching division 51.

Futher, to insure more delicate decision-making in each controller, a status decision result at each subsystem can be classified into heavy fault, medium fault, light fault, normal and the like to output accordingly. Further, a normalcy for each subsystem can be output as a numeric value.

(5) Control signal selection section

What functions as the core in this embodiment is the control signal selection. The control signal selection section comprises the synthetic decision sections 64, 65 and 66 provided at each subsystem and the output signal switching sections 51, 52 and 53 switching output signals for practical purposes as outputs of the synthetic decision divisions 64, 65 and 66 of each subsystem. The output signal switching sections 51, 52 and 53 are connected to device 55 to be plant control.

The main problem in the multiplexed plant control units is selecting an optimum control signal. In a general multiplexed plant control unit, the synthetic decision section called the Baudot section employs a single system, namely that in which each output signal switching division is operated according to a control signal from one Baudot division instead of a mutual decision system as in the embodiment; therefore, should the Baudot division make a wrong decision, the entire multiplexed plant control unit could malfunction. In this embodiment, the synthetic decision sections 64, 65 and 66 are provided at each subsystem, and a novel decision section redundant system is employed to select the controller regarded as functioning most normally from the output signals of each synthetic decision section according to 2-out-of-3 logic.

As described in paragraph 4), the synthetic decision divisions 64, 65 and 66 take in all the diagnostic result signals 44, 45, 46 of each subsystem which are output by controllers 11, 12 and 13 practically, select one controller which is presumed to be functioning most normally according to majority decision logic on the diagnostic result of having output "1" and the number of signals, and then output a selected signal to that effect for each one. If the controllers of two subsystems are determined to be functioning normally to almost the same degree, the synthetic decision division selects the controller of one subsystem having been so selected and also the controller of the subsystem having the higher priority of the two. In this case, the controllers 11, 12 and 13 are prioritized in the order of, for example, the controllers 11, 12 and 13. Accordingly, each synthetic decision section selects only one controller which is regarded as functioning most normally at that point in time of decision under any circumstances.

Selection signals output from each synthetic decision section are input to all the output signal switching section 51, 52 and 53. Accordingly, the situation is such that the selection signals from the three synthetic decision sections 64, 65 and 66 are input to one output signal switching section. The structure of the output signal switching section 51, for example, will be described in detail with reference to FIG. 4. The output signal switching section 52 and 53 have the same construction as the output signal switching section 51. The output signal switching section 51 comprises a 2-out-of-3 logic circuit 54A inputting all the selection signals output from the synthetic decision sections 64, 65 and 66, a 2-out-of-3 logic by-pass circuit 54B outputting a result according to a decision of the remaining synthetic decision section in operation when two synthetic decision sections get abnormal or inoperative, a fixed contact P for inputting a control signal output from the controller, a fixed contact Q, a fixed contact R and a moving contact S connected Q, a fixed contact R and moving contact S connected to the equipment 55 to be plant control 1. The test tool 100 is connected to the fixed contact R, as occasion demands. The 2-out-of-3 logic circuit 54 provided on the output signal switching section 51 of the subsystem A actuates the moving contact S of the output signal switching section 51 to connect the fixed contact P and the fixed contact Q, when two or more selection signals of the three selection signals output from the three synthetic decision sections 64, 65 and 66 are those of selecting the controller 11.

However, while capable of masking an abnormality for one input signal of those three, the ordinary 2-out-of-3 circuit cannot operate at the time of abnormality of two input signals, which problem cannot be avoided. Therefore, in this embodiment, a self-diagnostic function is added to each of the synthetic decision sections 64, 65 and 66, and when a self-diagnostic result indicates abnormality at the two synthetic decision sections, the control signal can be selected only on a decision of the remaining synthetic decision section, thus providing the 2-out-of-3 logic by-pass circuit 54B.

The moving contact S of the output signal switching section 51 does not connect the fixed contact P and the fixed contact Q in cases other than the above. Where two or more selection signals of the input three selection signals are those of selecting the controller 12, the 2-out-of-3 logic circuit provided on the output signal switching section 52 of the subsystem B actuates the moving contact S of the output signal switching section 52 to connect the fixed contact P and the fixed contact Q. The moving contact S is also actuated to connect the fixed contact P and the fixed contact Q when 2-out-of-3 logic by-pass logic is formed.

Where two or more selection signals of the input three selection signals are those for selecting the controller 13, the 2-out-of-3 logic circuit provided on the output signal switching division 53 of the subsystem C actuates the moving contact S of the output signal switching division 53 to connect the fixed contact P and the fixed contact Q. Then, the moving contact S is also actuated to connect the fixed contact P and the fixed contact Q when 2-out-of-3 logic bypass logic is formed.

Accordingly, if an abnormality occurs on one of the synthetic decision sections 64, 65 and 66, the control signal will not be selected in error finally by providing the 2-out-of-3 circuit 54A. Then, an abnormality occurring on one of the output signal switching divisions will not matter. Further, the embodiment also has the function of ensuring that when two subsystems get down or off-line, the remaining subsystem can be selected automatically unless the self-diagnostic result that the remaining subsystem is malfunctioning has been obtained by providing the 2-out-of-3 logic by-pass circuit 54B as described above. The embodiment having these functions realizes a system ready for controlling in sequence, if one unit only of the three can be operated continuously.

Figure 5:
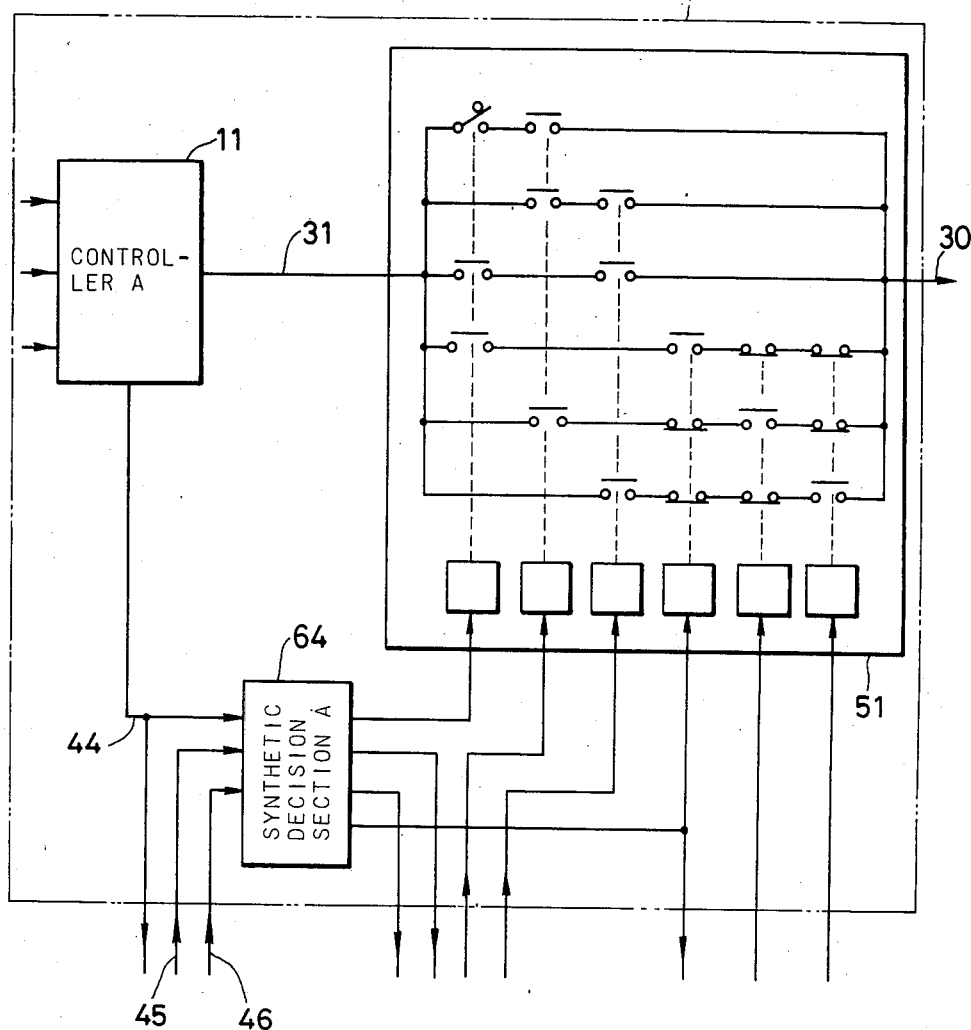
FIG. 5 is a drawing representing another variant of FIG. 4.

In FIG. 4, the contacts P, Q, R are arranged in one piece each, therefore if the contacts are constituted of relays or the like, there may be a case where the output signal of the controller 11 so selected is not transferred to an object of control or outputs of two or more controllers are transferred to the object of control due to a single fault in the relay such as a defective contact, contact weld, coil disconnection or the like. The reliability of relays is generally high enough to preclude this; however, if a single fault in this part is to be prevented, then a circuit shown in FIG. 5 to have the logic of FIG. 4 constituted directly of an output signal selection line can be applied.

Then, in case all the three systems go down, it goes without saying that the output operates in as a fail-safe or fail-as-is system.

Since a multiplexing effect can be fully secure according to this embodiment, a fault tolerant system will be obtainable, thereby ensuring high reliability.

As described above, according to this embodiment, a multiplexed plant control unit greatly increases reliability, and thus the operating ratio of the plant is enhanced considerably.

Then, a decision logic for the synthetic decision division has been described as a decision system based on selecting the majority; however, for more precise logic, a method for selecting from those coming most normally in sequence is conceivable when the status of each subsystem is classified into heavy fault, medium fault, light fault and normal, or another method for selecting the system maximum in numeric values is conceivable when normalcy in each subsystem is represented by a numeric value. In this case, the obtained decision reslut itself is more precise, but the logic of the synthetic decision section becomes complicated.

Further, to prevent unnecessary switching, it is also effective to arrange the logic so that what is selected as being controlled currently is left as selected when, for example, it is kept on the same rank.

This invention can be applied not only to a triplex plant control unit but also to a duplex plant control unit.

According to this invention, a multiplexed system with the common part minimized can be constituted, therefore a system particularly high in reliability can easily be realized.

What is claimed is:

1. A multiplexing control unit, comprising a detector for detecting a quantity or state, a plurality of controllers which input an output signal from said detector to an arithmetic unit providing an arithmetic operation and output a result of the arithmetic operation and have a diagnosing function for diagnosing a normalcy of said result of said arithmetic operation and also a normalcy of the control unit including said arithmetic unit, and output a decision result signal of said diagnosing function, a synthetic decision section selecting one controller functioning most normally on said decision result signals from said controllers according to a majority, and outputs a selection command signal corresponding to the selected controller, an output signal switching section selecting an output signal from the controller functioning most normally on said selection command signal from said synthetic decision section according to the principle of selecting the majority to output to a device to be controlled.

2. The multiplexing control unit as defined in claim 1, wherein said controllers output normalcy of the output signal and the control unit according to a self-diagnosis on an operator or a diagnosing circuit incorporated therein for outputting said decision result signals based on said diagnostic function.

3. The multiplexing control unit as defined in claim 1, wherein said synthetic decision section selects one controller functioning most normally according to a predetermined priority when a plurality of controllers are determined to be normal by said diagnostic function.

4. The multiplexing control unit as defined in claim 1, wherein said controllers have an information transmission circuit for transmitting an operational information of a self controller to an other controller and also for transmitting an operational information of said other controller to said self controller, each controller determining normalcy of said self controller and normalcy of said other controller according to said diagnostic function and outputs said decision result signal based on the operational information input to said self controller from said other controller through said information transmission circuit and said operational information of said self controller.

5. The multiplexing control unit as defined in claim 4, wherein said controllers send the output signal according to the operational information of the self controller when the operational information of the self controller is determined to coincide with those from a plurality of the other controllers by the self diagnostic function of said self controller, and send the output signal according to the operational information of said other controllers when the operational information of the self controller does not coincide with those from a plurality of other controllers.

6. The multiplexing control unit as defined in claim 4, wherein a transmission circuit disconnector is provided on said information transmission circuit so as to prevent the abnormality signal from being transmitted to a normal controller through said information transmission circuit when said controller decides an auto operation result as being abnormal.

7. The multiplexing control unit as defined in claim 4, wherein said transmission circuit is an insulated data transmission circuit to which optical transmission is applied.

8. The multiplexing control unit as defined in claim 1, further comprising an input signal switching division to prevent an abnormality signal from arising between said detector and said controllers from being input to said controllers.

9. The multiplexing control unit as defined in claim 8, wherein said input signal switching section, said controller, said synthetic decision section and said output signal switching division are constituted of a plurality of subsystems to control the same system to be controlled, said subsystems each having its own power source.

10. The multiplexing control unit as defined in claim 8, wherein said input signal switching section and said output signal switching section have a terminal for keeping output signals from said detector and said controllers cut off, and are provided with a test tool for testing said individual subsystems by impressing an output signal from a signal generator for the test tool between said terminals.

11. The multiplexing control unit as defined in claim 1, wherein said output signal switching section inputs the selection command signals from said synthetic decision section, and when the selection command signals of a value at least two are present, selects the output signal from one controller according to said selection command signals of a value to output to said equipment to be controlled.

12. The multiplexing control unit as defined in claim 1, wherein said output signal switching section inputs the selection command signals from said synthetic decision section, and when the selection command signal from an other synthetic decision section is determined to be abnormal by the self diagnostic function thereof and the selection command signal of the self synthetic decision section is determined to be normal by the self diagnostic function thereof, selects the output signal from the self controller according to the self selection command signal to output to the equipment to be controlled.

13. A multiplexing control unit comprising a combination of subsystems constituted for each of the following in several parts to control the same objective system:

(1) a detector providing at each subsystem to detect a quantity or state;

(2) an input signal switching section to keep an abnormality signal from being input to a self subsystem from said detector;

(3) controllers for computing an output signal according to a signal input from said detector through said input signal switching section to output; said controllers having information transmission circuits for transmitting an operation result of the self subsystems controller to other subsystem controllers and also transmitting the operation results of other subsystem controllers to the self subsystem controller, deciding normalcy of said self subsystem controller and normalcy of said other subsystem controllers according to the subsystem diagnostic functions for diagnosing a normalcy of each result of an arithmetic operation carried out in each controller and output decision results of said diagnostic functions based on operational information input to said self subsystem controller from said other subsystem controllers through said information transmission circuits and said operational information of said self subsystem controller thus having output diagnostic result signals for each case where the operation result of the self subsystem controller is normal or abnormal;

(4) transmission circuit disconnectors provided on said information transmission circuits to keep abnormal information from being transmitted to a normal controller through said information transmission circuits when said controllers decide that the operating state of the self subsystem controller is abnormal based on said diagnostic function;

(5) a synthetic decision section to output selectively selection command signal corresponding to one controller functioning most normally on said diagnostic result signal from said controllers according to a predetermined priority; and (6) an output signal switching section to select an output signal from the controller functioning most normally according to the selection command signal from said synthetic decision section to output to an equipment to be controlled.

* * * * *